US006643445B2

United States Patent
Bumgarner et al.

(10) Patent No.: US 6,643,445 B2
(45) Date of Patent: Nov. 4, 2003

(54) FIBER OPTIC SPOOLS AND METHODS OF MAKING THE SAME

(75) Inventors: Kirk P. Bumgarner, Wilmington, NC (US); Michael T. Murphy, Oak Island, NC (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/033,140

(22) Filed: Nov. 1, 2001

(65) Prior Publication Data
US 2002/0106178 A1 Aug. 8, 2002

Related U.S. Application Data
(60) Provisional application No. 60/258,143, filed on Dec. 22, 2000.

(51) Int. Cl.[7] .................................................. G02B 6/00
(52) U.S. Cl. .................................... 385/137; 385/137
(58) Field of Search ................................ 385/135, 134, 385/136, 137

(56) References Cited
U.S. PATENT DOCUMENTS 5,165,543 A * 11/1992 Heyda et al. ............... 206/400
5,218,664 A    6/1993 O'Neill et al. ............. 385/135
5,594,827 A *  1/1997 Joulie et al. ............... 385/101
5,778,122 A    7/1998 Giebel et al. .............. 385/55
6,201,923 B1   3/2001 Yuhara et al. .............. 385/137

FOREIGN PATENT DOCUMENTS
JP         06-059137    * 3/1994 ........... G02B/6/00

* cited by examiner

Primary Examiner—Jean F. Duverne
(74) Attorney, Agent, or Firm—Timothy R. Krogh; Kevin M. Able

(57) ABSTRACT

The present invention relates to a fiber optic spool which includes a spool including a barrel having opposed ends, a first flange positioned on one end of the barrel, and a second flange positioned on the other end of the barrel; and an elastic foam tube substantially surrounding the barrel under conditions whereby the foam tube is stressed radially while in its resting state on the barrel such that the foam tube resists lifting away from the barrel during rotation of the spool at speeds effective to wind or unwind at least about 25 m of optical fiber per second. Related aspects of the present invention include fiber optic spools including multi-laminar cushioning devices, such multi-laminar cushioning devices, and methods of making fiber optic spools of the present invention.

14 Claims, 7 Drawing Sheets

FIBER OPTIC SPOOLS AND METHODS OF MAKING THE SAME

PRIORITY DOCUMENT

This application claims the benefit of U.S. patent application Ser. No. 60/258,143, filed Dec. 22, 2000, the benefit of priority is hereby claimed.

The present invention relates to fiber optic spools and methods of making the same.

BACKGROUND OF THE INVENTION

Fiber optic spools, like most spools in general, are formed of two flange members positioned on opposite ends of a spool barrel. To prepare a fiber optic spool such that it is capable of receiving an optical fiber, it is common practice to use foam as a winding surface on the barrel of the spool. The foam on the barrel acts as an expansion joint and absorbs dimensional changes that result during thermal cycling of the wound spool since the coated fiber and the spool have significantly different coefficients of thermal expansion. Therefore, the foam should be able to endure thermal extremes without disturbing the integrity of the package.

The spools are formed by joining together two or three components. According to one approach a pair of similar spool members, each including a barrel portion (i.e., a half-length barrel) and an integral flange, are joined together using an adhesive or solvent which welds together the abutting ends of the barrel portions thereof. According to a second approach, a spacer element is joined between the barrel portions of the spool members in a similar manner, thereby affording a spool possessing a longer barrel.

The foam frequently used for fiber optic spools is a closed cell polyethylene available from Sekisui America Corp., Voltek Division (Lawrence, Mass.). This closed cell polyethylene is characterized by a density of 2.40 lbs/ft$^3$ (3.84× 10$^{-2}$ kg/l), a tensile modulus of 505 lbs/in$^2$ (35.5 kg/cm$^2$) (machine direction), and a thermal stability of 4% shrinkage (machine direction) or 3.2% shrinkage (cross-machine direction).

Two basic techniques have been used, in the past, to apply the closed cell polyethylene to the barrel of the spool. In a first approach, a linear piece of foam is cut to size and then wrapped around a mandrel. The ends of the foam are then heat welded such that the foam forms a tube which is open at both ends. The foam tube can be installed on the spool by slipping the tube over the barrel portion of one spool member before the barrel portions thereof are joined together to form the spool. In a second approach, the linear piece of foam (which has been cut to size) is wrapped about the spool barrel and double-sided tape is applied either to the foam or the barrel to secure the ends of the foam to the barrel.

Although the previously used closed cell polyethylene has proven useful, several problems exist with this foam material. First, the closed cell polyethylene is not sufficiently resistant to surface damage (i.e., abrasions) and does not endure the abuse of handling or cabling operations very well. Second, during spooling operations, for instance, centrifugal forces cause the foam to "grow" away from the spool barrel, lifting the foam off of the barrel surface and creating an uneven winding surface. This is particularly true at winding speeds sufficient to wind about 25 m (or more) of optical fiber per second. Third, closed cell polyethylene has a tendency to shrink during or following exposure to temperatures of about 50° C. or higher. Such shrinking can create gaps between the foam and the flanges, which may interfere with subsequent optical fiber pay-off from the spool.

Likewise, the above methods of installing the closed cell polyethylene has resulted in additional problems. For instance, when using double-sided tape, gaps typically appear where the foam ends butt together. While small gaps may not necessarily be problematic, it is best-if at all possible-to avoid any exposed gaps.

The present invention is directed to overcoming these deficiencies in the art.

SUMMARY OF THE INVENTION

The present invention relates to a fiber optic spool which includes a spool including a barrel having opposed ends, a first flange positioned on one end of the barrel, and a second flange positioned on the other end of the barrel; and an elastic foam tube substantially surrounding the barrel under conditions whereby the foam tube is stressed radially while in its resting state on the barrel such that the foam tube resists lifting away from the barrel during rotation of the spool at speeds effective to wind or unwind at least about 25 m of optical fiber per second.

Another aspect of the present invention relates to a method of making a fiber optic spool of the present invention. This method includes assembling a spool including a barrel and flanges positioned on opposite ends of the barrel, and installing about the barrel a foam tube which is elastic and, prior to installing, has an inner circumference that is smaller than the outer circumference of the barrel.

The present invention also relates to a fiber optic spool which includes a spool including a barrel having opposed ends, a first flange secured on one end of the barrel, and a second flange secured on the other end of the barrel; and a multi-laminar cushioning device having a first layer including an open cell foam or closed cell foam and a second layer including a protective material which is connected to and substantially covers the first layer, wherein the multi-laminar cushioning device is in the form of a tube which substantially surrounds the barrel of the spool with the first layer resting against the barrel surface.

A related aspect of the present invention is a substantially tubular, multi-laminar cushioning device which includes an inner layer including an open cell foam or closed cell foam and an outer layer including a protective material which is connected to and substantially covers the inner layer. The substantially tubular, multi-laminar cushioning device is preferably sized and configured for installation on the barrel of a fiber optic spool.

Yet another aspect of the present invention relates to a method of making a fiber optic spool which includes assembling a spool including a barrel and flanges position on opposite ends of the barrel, and installing about the barrel a substantially tubular multi-laminar cushioning device of the present invention.

Still another aspect of the present invention relates to a method of winding optical fiber onto a spool. This method includes providing an optical fiber spool including a barrel and flanges positioned on opposite ends of the barrel, and a cushioning device which substantially surrounds the barrel and resists lifting away from the barrel during rotation of the spool at a velocity sufficient to wind 25 m or more of optical fiber per second; and winding optical fiber onto the optical fiber spool.

By combining the new cushioning devices of the present invention with suitable spool assemblies, it is possible to achieve fiber optic spools that overcome some or all of the aforementioned deficiencies in the prior art. Either through the use of adhesives, pre-stressed cushioning devices, or multi-laminar cushioning devices, the spools are able to rotate, at speeds sufficient to take-up or pay-out up to about 40 m or more of optical fiber per second, without resulting in cushioning device "growth". Moreover, by selecting desirable materials, it is possible to expand the longevity of the cushioning devices employed in fiber optic spools of the present invention, either by minimizing shrinkage of the materials or by rendering them better able to endure physical abuse.

Additionally the inventive foam has a lower density than that of foams previously used on an optical fiber spool. Also the inventive foam has exhibited a reduced elongation during use than foams previously used on an optical fiber spool. Furthermore, the inventive foam has exhibited a higher tensile modulus than previously exhibited by foams previously used on an optical fiber spool. The invention also reduces elongation of the foam during use by introducing residual tensile stresses in the foam prior to and after use.

BRIEF DESCRIPTION OF THE DRAWINGS

As shown in FIG. 3C, the cluster of four arrows together represent the circumferential expansion of the elastic foam tube prior to its installation onto the barrel portion of one spool member.

DETAILED DESCRIPTION OF THE INVENTION

The present invention relates to fiber optical spools which include a foam cushioning device substantially surrounding a barrel of the spool, whereby the foam cushioning is capable of enduring—without significant lifting ("growth") away from the barrel—rotational speeds sufficient to wind at least about 25 m of optical fiber per second, preferably at least about 30 m/s, more preferably at least about 35 m/s, even more preferably at least about 40 m/s, and most preferably at least about 50 m/s.

Figure 12:
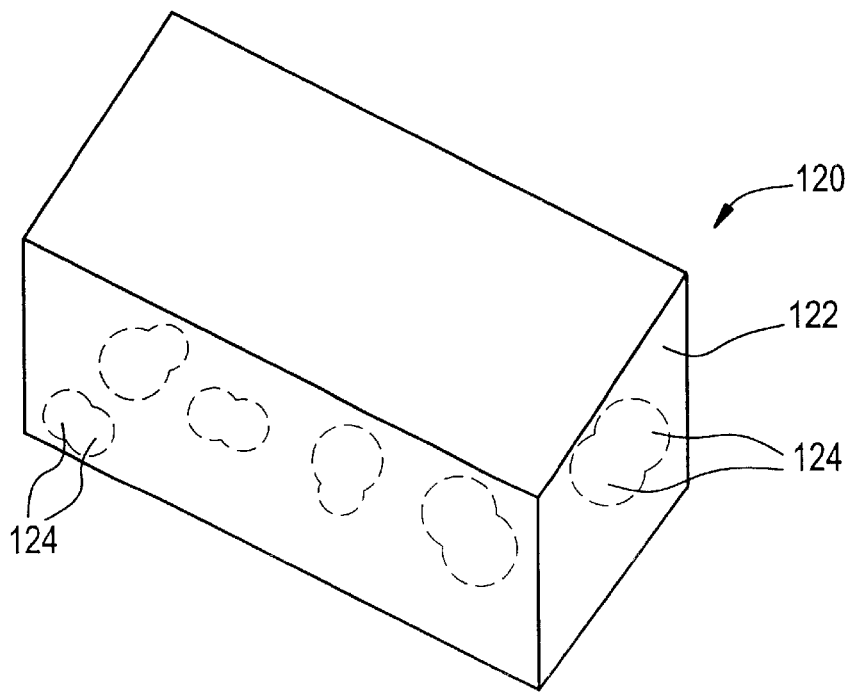
FIG. 12 is a plan view of an open cell foaming depicting the closed cells in phantom.

As used herein, foam materials which are characterized by predominantly interconnected foam cells are referred to as open cell foams. Depicted in FIG. 12, generally designated 120, is a plan view of a section of an open cell foam. Foam 120 includes a substrate 122 and a plurality of interconnected cells 124. Any number of cells 124 may be interconnected, e.g., two cells, three cells, four cells, etc. Cells 124 may be connected in any type of alignment. Cells 124 may be aligned uniformly or randomly in substrate 122. The size and/or shape of cells 124 may be uniform or random.

Figure 11:
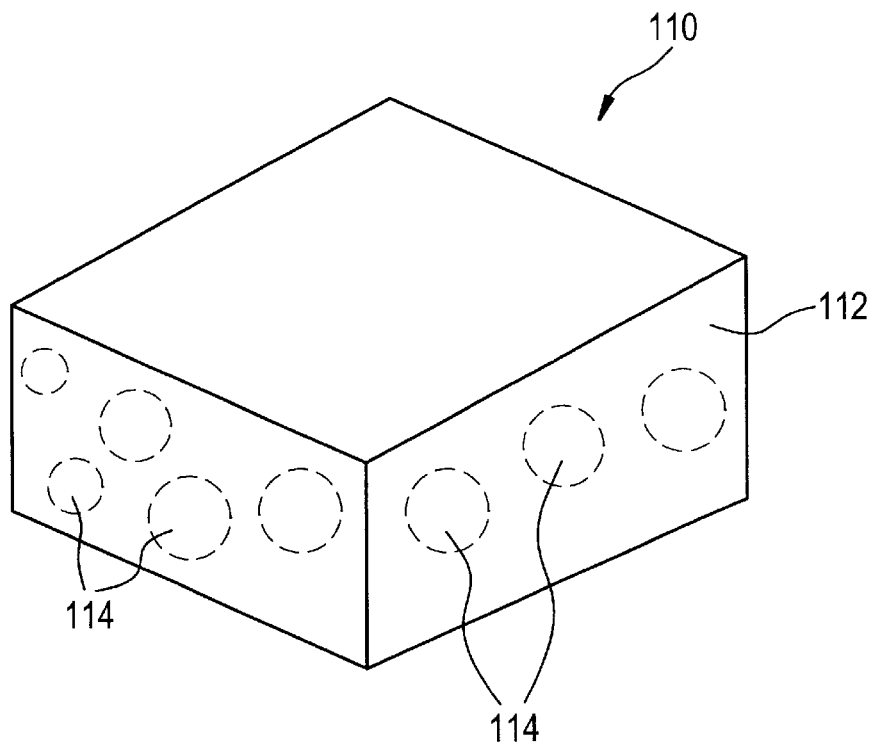
FIG. 11 is a plan view of a closed cell foaming depicting the closed cells in phantom.

In contrast, foam materials which are characterized by predominantly unconnected foam cells are referred to as closed cell foams. A closed cell foam is depicted in FIG. 11, and generally designated 110. Foam 110 includes at least a substrate 112 and a plurality of cells 114. Cells 114 are not interconnected. Cells 124 may be uniformly or randomly aligned in substrate 114. The size and/or shape of cells 114 may be uniform or random.

One aspect of the present invention relates to a fiber optic spool which includes a spool and an elastic foam tube substantially surrounding a barrel of the spool. The barrel of the spool has opposed ends and the spool also includes a first flange secured on one end of the barrel and a second flange secured on the other end of the barrel. The elastic foam tube is characterized, prior to placement onto the barrel, by an inner circumference that is smaller than the outer circumference of the barrel. Thus, upon placing the elastic foam tube onto the barrel, the foam tube is stressed radially (i.e., about its entire circumference) while in its resting state on the barrel. The effect of such radial stress is that the foam tube resists lifting away from the barrel during rotation of the spool at speeds effective to wind or unwind at least about 25 m of optical fiber per second.

Figure 1:
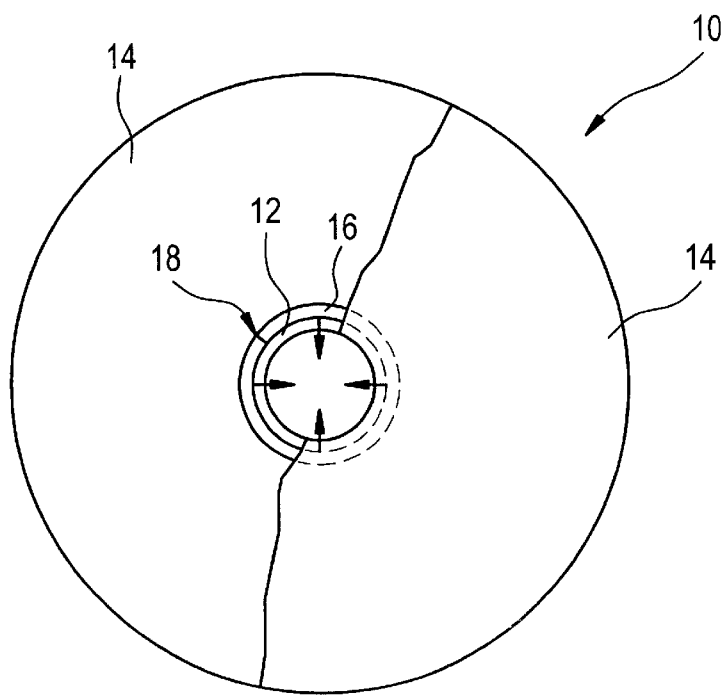
FIG. 1 is an end view of a fiber optic spool according to one embodiment of the present invention. A portion of the flange at one end of the spool is broken away to reveal an elastic foam tube which substantially surrounds the spool barrel. Arrows indicate the inward compression of the foam tube against the barrel surface.
Figure 2:
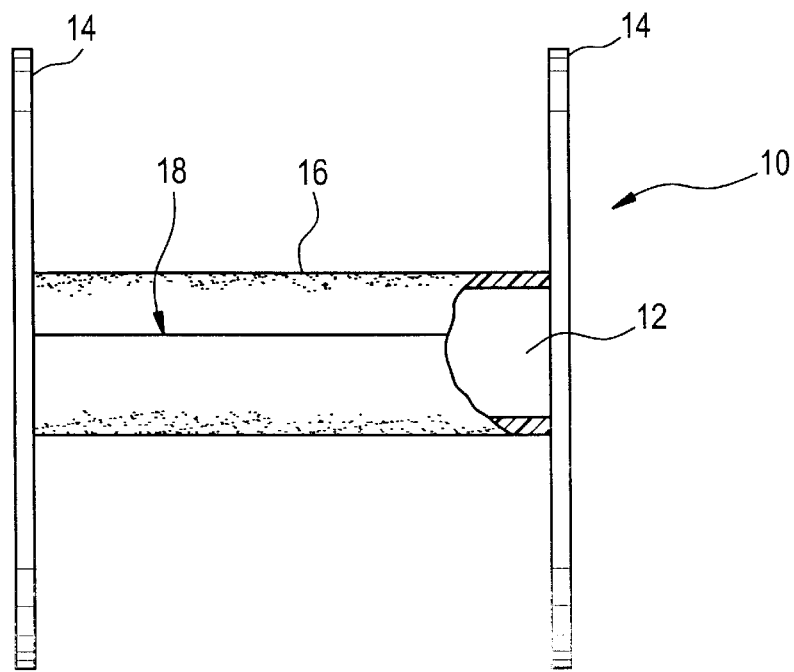
FIG. 2 is a side elevation view of the embodiment shown in FIG. 1. A portion of the elastic foam tube is broken away to expose the barrel beneath.

One embodiment of such a fiber optic spool is illustrated in FIGS. 1–2, where the fiber optic spool 10 is shown to include a spool containing a barrel 12 and flanges 14 positioned on opposite ends of the barrel, as well as an elastic foam tube 16 which substantially surrounds the barrel. The elastic foam tube 16 is formed of a single sheet of foam that is sealed along a seam 18. As indicated by the arrows shown in FIG. 1, the elastic foam tube tightly compresses against the surface of barrel.

Preferably, the foam tube is formed of a closed cell foam material having one or more of the following properties: a density of less than about 2.4 lbs/ft$^3$ (3.52×10$^{-2}$ kg/l), more preferably less than about 2.2 lbs/ft$^3$ (3.20×10$^{-2}$ kg/l), most preferably about 2.0 lbs/ft$^3$ or less; a maximum thermal shrinkage which is less than about 4 percent (machine-direction) or less than about 3.2 percent (cross machine-direction), more preferably less than about 3 percent (machine-direction) or less than about 2 percent (cross machine-direction); and a minimum tensile modulus of at least about 800 lbs/in$^2$ (56.2 kg/cm$^2$), more preferably at least about 850 lbs/in$^2$ (59.8 kg/cm$^2$), most preferably at least about 900 lbs/in$^2$ (63.3 kg/cm$^2$). Thermal shrinkage, as used herein, is defined as the degree of shrinkage resulting from a 3 hour exposure to a temperature of 215° F.

A preferred foam material is an closed cell foam formed of a polymer, preferably a visco-elastic polymer, more preferably the polymer is non-linear and anisotropic. Suitable polymers include polypropylene, which polypropylene foam is available from Sekisui America Corp., Voltek Div., under the specification number 2LMB.188OB. This particular polypropylene closed cell foam is characterized by the following characteristics: a density of about 2.0 lbs/ft$^3$ (3.2×10$^{-2}$ kg/l); a maximum thermal shrinkage which is about 2.2 percent (machine-direction) and about 1.6 percent (cross machine-direction); and a minimum tensile modulus of about 967 lbs/in$^2$ (68 kg/cm$^2$) (machine direction). An alternative polymer is polymer which may exhibit the above properties, certain grades of polyethylene may exhibit the above properties. Preferably the foam has a specific weight of about 2.0 lbs/ft$^3$.

The elastic foam tube 16 preferably has a thickness of between about ⅛ inch (3 mm) to about ½ inch (13 mm), more preferably about ⅛ inch (3 mm) to about ⅜ inch (10 mm), most preferably about 3/16 inch (5 mm), prior to its installation onto the fiber optic spool.

By pre-stressing the elastic foam tube 16 such that it constricts tightly against the barrel 12, it is possible to achieve a fiber optical spool which is capable of rotating at speeds sufficient to take-up or pay-out at least about 30 m of optical fiber per second, more preferably about 35 m of optical fiber per second, even more preferably at least about 40 m of optical fiber per second, and most preferably at least about 50 m of optical fiber per second. Such take-up or pay-out speeds can be achieved using fiber optic spools of the present invention, which do not exhibit undesirable foam "growth" and, thus, enable more efficient processing speeds for the manufacture and utilization of optical fibers.

Figure 3A:
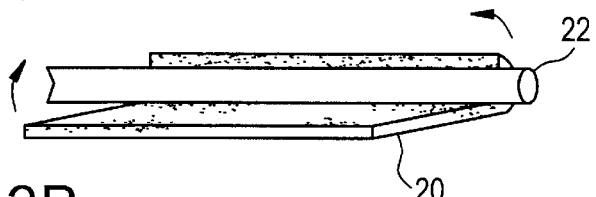
FIGS. 3A–D illustrate a method of making an elastic foam tube and a fiber optic spool according to the embodiment shown in FIGS. 1–2. All arrows indicate direction of travel.
Figure 3B:
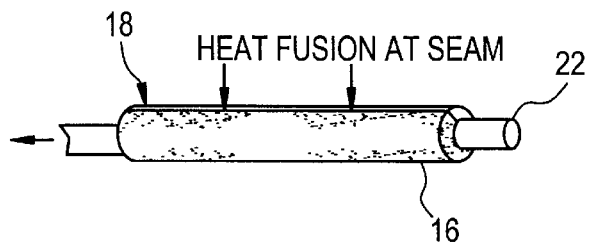

FIGS. 3A–D illustrate a method of making a fiber optic spool of the type shown in FIGS. 1–2. A sheet 20 of foam material as described above is cut to size and configuration for placement about the spool barrel. Specifically, the sheet 20 is sized and configured such that its length is smaller than the outer circumference of the barrel 12, thereby affording a foam tube 16 which has an inner circumference which is smaller than the outer circumference of the barrel 12. Preferably, the difference between the inner circumference of the foam tube 16 (i.e., prior to installation) and the outer circumference of the barrel 12 is about 0.05 inches (1.27 mm) to about 0.18 inches (3.81 mm), more preferably about 0.15 inches (2.79 mm) or less, and most preferably about 0.11 inches or less. In one embodiment of the invention, the length of the foam is 0.109 inches less than the circumference of barrel 16. Once the sheet 20 has been prepared, it is wrapped about a cylindrical mandrel 22 as shown in FIG. 3A and then the abutting ends of the sheet are sealed or otherwise joined together, preferably by heat fusion as illustrated in FIG. 3B. After sealing together the abutting ends, the foam tube 16 has been prepared and the mandrel 22 is withdrawn.

Figure 3C:
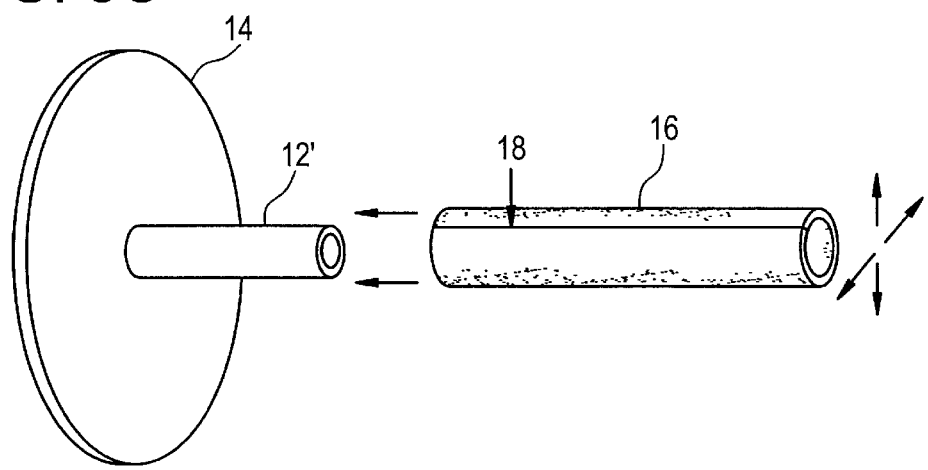
Figure 3D:
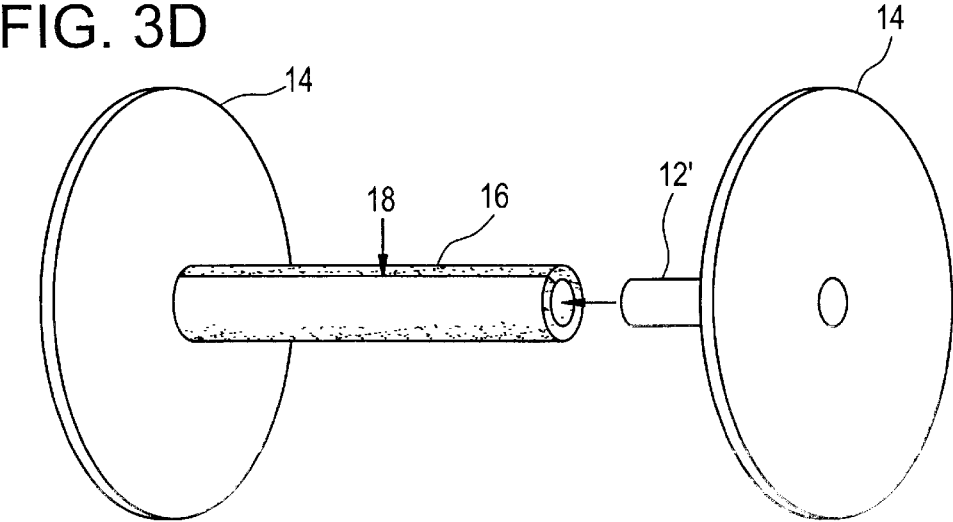

As shown in FIG. 3C, prior to its installation about the barrel 12, the foam tube 16 is expanded radially in all directions (as indicated by the four arrows) to enlarge the inner circumference of the foam tube 16. This can be achieved either by hand or by machine stretching of the foam tube during assembly of the spool. Having expanded the foam tube 16, it can be installed onto the barrel portion 12' of one spool member by sliding the foam tube onto one end of the barrel portion 12' until it abuts the flange 14. Due to its elastic nature, the foam tube 16 will attempt to return to its original configuration, but due to the larger circumference of the barrel portion 12' the foam tube will remain in a partially stressed state, tightly constricting against the barrel portion 12'. As shown in FIG. 3D, the remaining spool member can be coupled to the spool member onto which the foam tube 16 has been installed. First, a solvent (e.g., Permabond, a methylethyl ketone solvent) or an adhesive of sufficient strength (about 1100 lbs/in$^2$ or 77.3 kg/cm$^2$) is applied to the end of the barrel portion 12' which will abut and, subsequently, be joined to the end of the opposing barrel portion 12' residing inside the foam tube 16. After applying the solvent or adhesive, the barrel portion 12' to which solvent or adhesive has been applied is inserted into the foam tube 16 after radially expanding the same (as described above). Once the solvent or adhesive joins together the barrel portions 12', a complete barrel 12 is formed inside the foam tube 16, which spans between the flanges 14 of the spool.

As an optional further measure to prevent "growth" of the foam tube 16 during rotation of the fiber optic spool, an adhesive can be applied either to the outer surface of the barrel 12 or the inner surface of the foam tube 16 prior to installation of the foam tube onto the barrel portions 12'. Typically, the application of such an adhesive is unnecessary to avoid "growth" under most current rotational velocities and, therefore, can be eliminated for purposes of efficiency and cost-savings.

Figure 8:
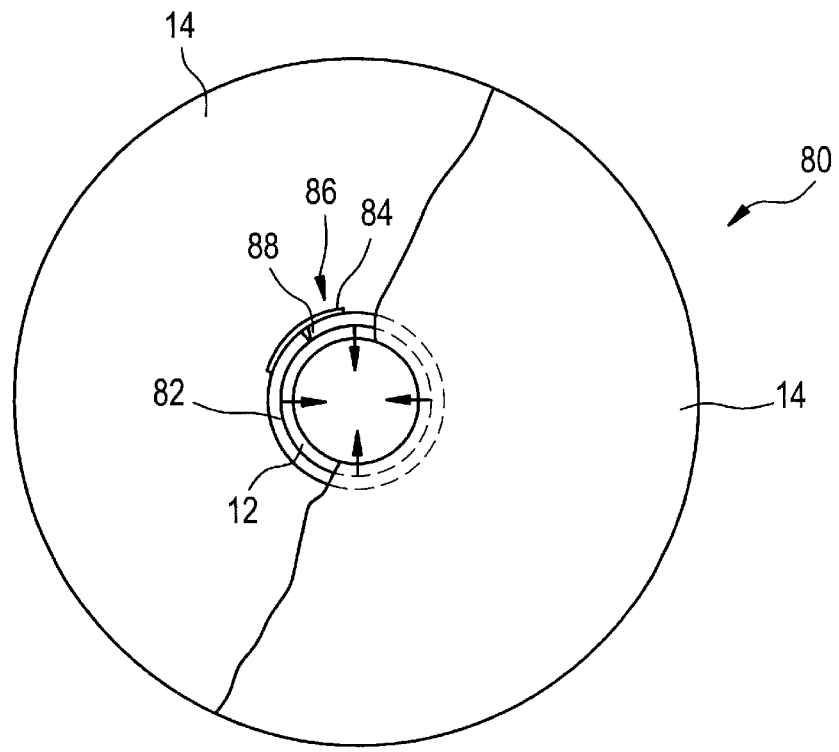
FIG. 8 is an end view of a fiber optic spool according to a fourth embodiment of the present invention. A portion of the flange at one end of the spool is broken away to reveal an elastic foam tube which substantially surrounds the spool barrel. Arrows indicate the inward compression of the foam tube against the barrel surface.
Figure 9:
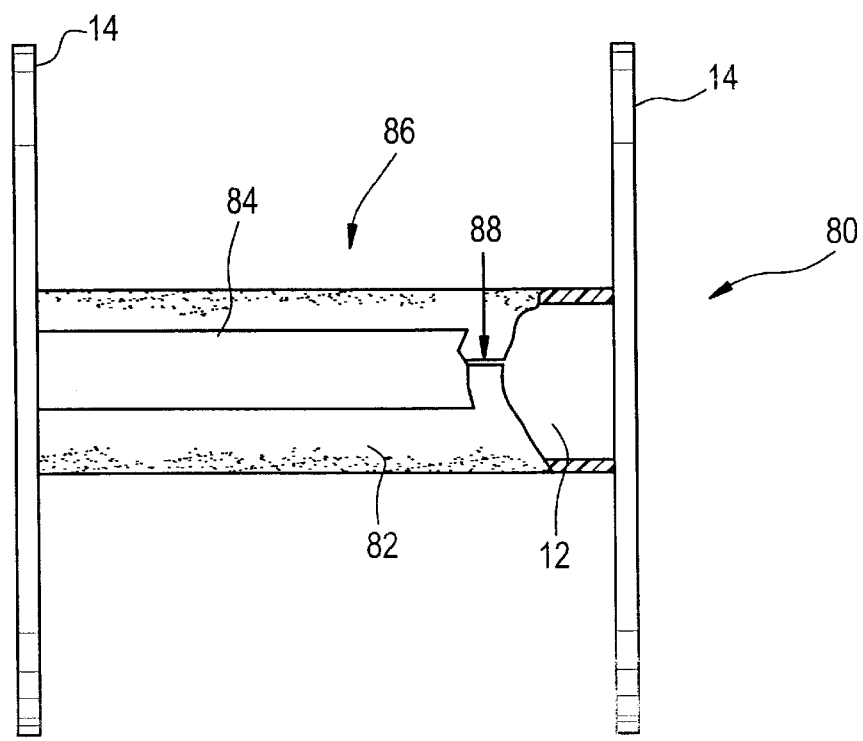
FIG. 9 is a side elevational view of the embodiment shown in FIG. 8. A portion of the elastic foam tube is broken away to expose the barrel beneath, and a portion of the adhesive tape is broken away to expose the seam of the foam tube.

Another embodiment of such a fiber optic spool is illustrated in FIGS. 8–9, where the fiber optic spool 80 is shown to include a barrel 12 and flanges 14 positioned on opposite ends of the barrel, as well as an elastic foam tube 86 which substantially surrounds the barrel. The elastic foam tube 86 is formed of a single sheet of foam 82 that has its abutting ends joined together by a strip of adhesive tape 84 that extends substantially that entire length of the seam 88. The strip of adhesive tape preferably has a thickness of not more than about 0.02 inches (0.51) mm. The adhesive tape includes an adhesive substance having a shear strength of at least about 110 lbs/in$^2$ (7.7 kg/cm$^2$). The strip of tape does not extend substantially about the entire outer circumference of the foam tube.

Much like the foam tube shown in FIGS. 1–2, the foam tube 86 is formed from a foam sheet 82 whose unstressed length is smaller than the outer circumference of the barrel 12. This results in a similar compression of the elastic foam tube 86 against the barrel 12. Preferably a tensile stress is applied to foam 86 for foam 86 to encompass barrel 12.

Preferably, the foam tube is formed of a closed cell foam material of the type described above, preferably a polypropylene foam as described above.

Figure 10A:
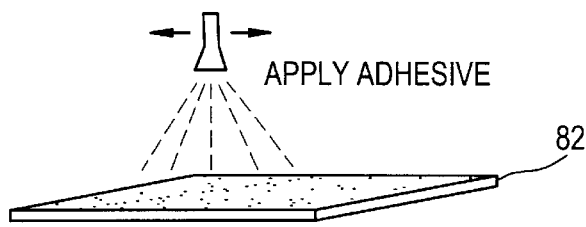
FIGS. 10A–D illustrate methods of making a fiber optic spool according to the embodiment shown in FIGS. 8–9. Arrows indicate direction(s) of movement.
Figure 10B:
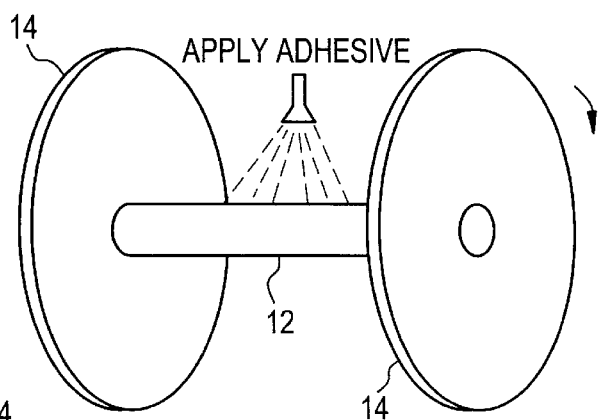
Figure 10C:
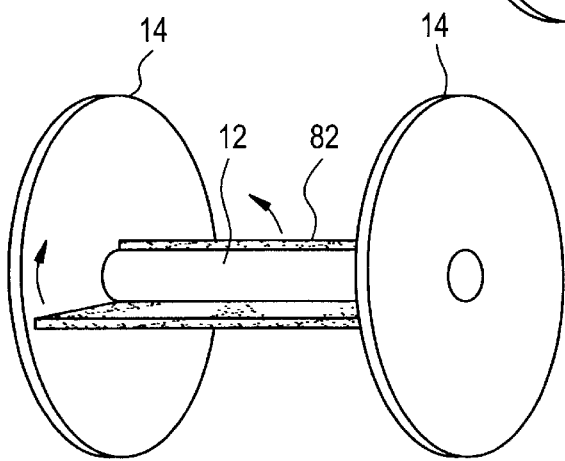
Figure 10D:
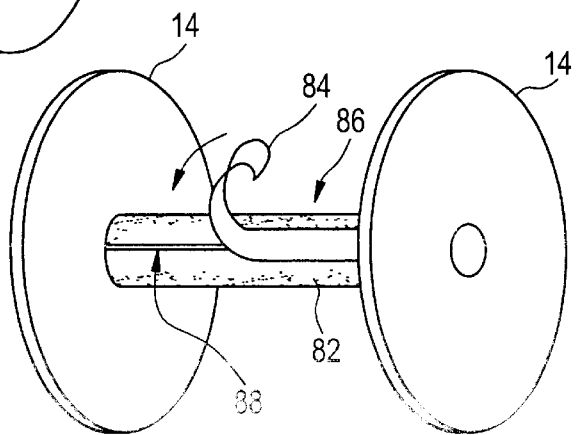

FIGS. 10A–D illustrate a method of making a fiber optic spool of the type shown in FIGS. 8–9. As shown in FIG. 10A, a foam sheet 82, which is sized and configured for placement about the barrel, is treated by application of an adhesive to one side of the foam sheet. As an alternative to applying the adhesive to the foam sheet 82, adhesive can be applied directly to the barrel 12 as shown in FIG. 10B. If desired, application of the adhesive can be eliminated altogether. Regardless of whether an adhesive has been applied, the foam sheet 82 is wrapped about the barrel 12, as shown in FIG. 10C, until the ends of the foam sheet abut one another along the seam 88. To cover any gap present along the seam 88, a strip of adhesive tape 84 is applied to the foam sheet 82, preferably along the entire length of seam 88. The adhesive tape, as indicated above, does not extend substantially about the entire barrel. However, the surface area of the tape should be sufficient, given the strength of the adhesive thereon and the forces encountered during use, such that the tape will not delaminate from the underlying foam material. Knowing the bonding area of the tape and the rotational velocity of the spool, one of skill in the art can readily determine the required shear bond capacity of the adhesive employed on the tape.

Preferably, the sheet of foam material 82 has a length which is shorter than the circumference of the barrel surface, therefore requiring that the foam sheet be wrapped about the barrel in a manner which affords the foam tube to be tightly constricted against the outer surface of the barrel. Preferably wrapping the foam around the barrel applies a tensile stress on the foam.

As an alternative to stretching a sheet of foam about the barrel such that the sheet of foam (and the resulting foam tube) compresses against the barrel surface, the adhesive can be used alone, with or without tape over the seam. Thus, the sheet of foam material would be sized exactly for placement about the barrel and an adhesive, applied to the foam or the barrel, is used to maintain the foam material in contact with the barrel surface during use of the spool.

Another aspect of the present invention relates to a fiber optic spool which includes a spool of the type described above and a multi-laminar cushioning device in the form of a tube which substantially surrounds the barrel of the spool. The multi-laminar cushioning device has a first layer including an open cell foam or closed cell foam and a second layer including a protective material which is connected to and substantially covers the first layer. While surrounding the barrel, the first layer of the multi-laminar cushioning device rests against the barrel surface.

Figure 4:
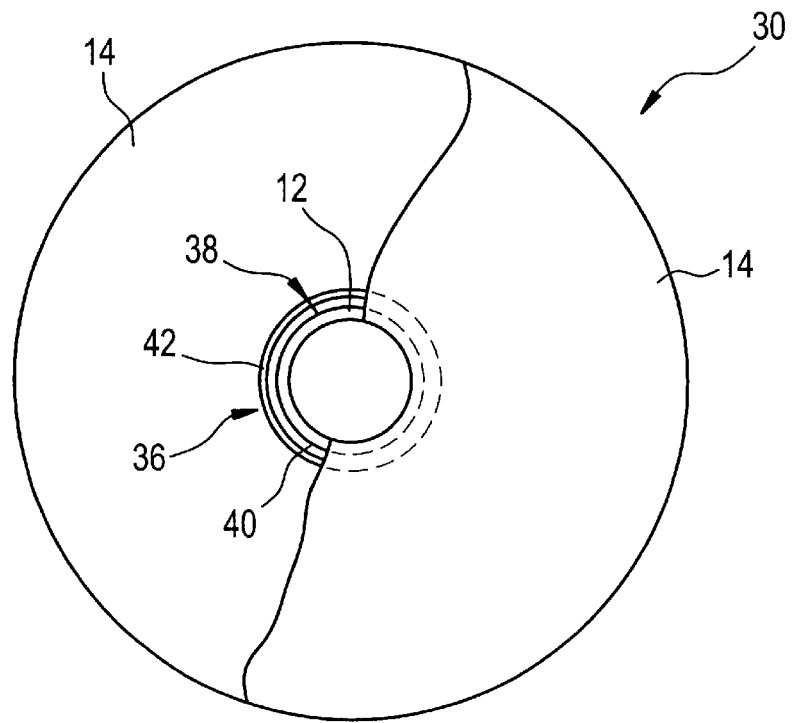
FIG. 4 is an end view of a fiber optic spool according to a second embodiment of the present invention. A portion of the flange at one end of the spool is broken away to reveal a substantially tubular, multi-laminar cushioning device of the present invention which substantially surrounds the spool barrel.
Figure 5:
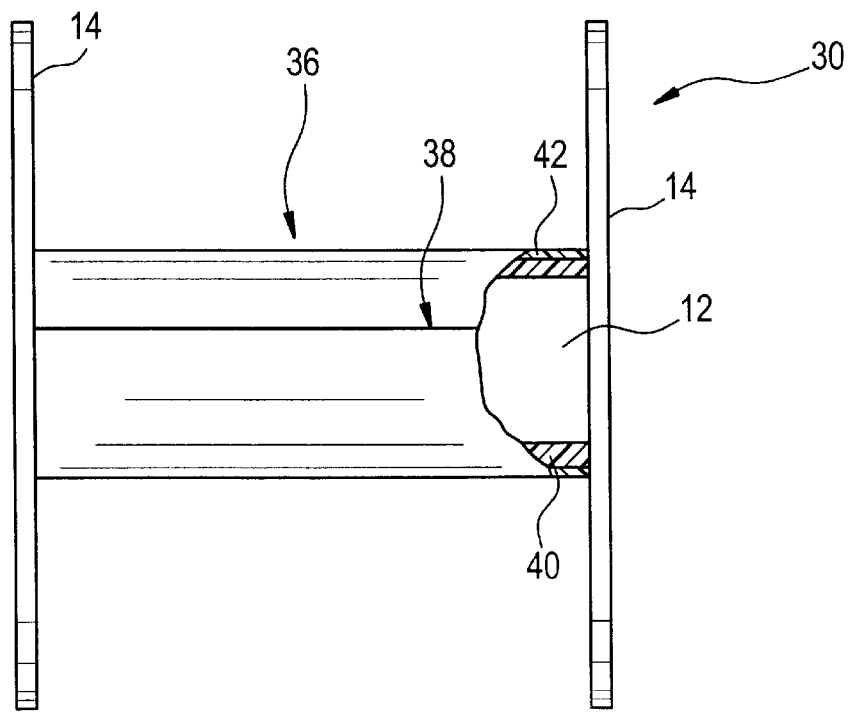
FIG. 5 is a side elevational view of the embodiment shown in FIG. 4. A portion of the substantially tubular, multi-laminar cushioning device is broken away to expose the barrel beneath.

One embodiment of such a fiber optic spool is illustrated in FIGS. 4–5, where the fiber optic spool 30 is shown to include a spool containing a barrel 12 and flanges 14 positioned on opposite ends of the barrel, as well as a tubular, multi-laminar cushioning device 36 which substantially surrounds the barrel. The tubular, multi-laminar cushioning device 36 is formed of a single multi-laminar sheet that is sealed along a seam 38. The multi-laminar sheet (and, thus, the multi-laminar cushioning device) includes two layers. The first layer 40 can be formed of either an open cell foam or a closed cell foam. The second layer 42 can be formed of a material which is suitable to protect the underlying foam layer.

Either open cell or closed cell foam materials are employed to form the first layer 40. Such foam materials should have one or more of the following properties: a density of less than about 2.4 lbs/ft$^3$ (3.8×10$^{-2}$ kg/l), more preferably less than about 2.2 lbs/ft$^3$ (3.5×10$^{-2}$ kg/l); a maximum thermal shrinkage which is less than about 4.0 percent (machine-direction) or less than about 3.2 percent (cross machine-direction), more preferably less than about 2.2 percent (machine-direction) or 1.6 percent (cross machine-direction); and a minimum tensile modulus of at least about 300 lbs/in$^2$ (21.1 kg/cm$^2$), more preferably at least about 400 lbs/in$^2$ (28.1 kg/cm$^2$).

One preferred closed cell foam is a cross-linked low-density polyethylene foam (available from Sekisui America Corp., Voltek Div.), which is characterized by the following properties: a density of about 2.0 lbs/ft$^3$ (3.2×10$^{-2}$ kg/l); a maximum thermal shrinkage which is about 4.0 percent (machine-direction) or 3.2 percent (a cross machine-direction); and a minimum tensile modulus of about 500 lbs/in$^2$ (35.2 kg/cm$^2$).

Another preferred closed cell foam is the polypropylene foam 2LMB.188OB as described above.

The protective material of the second layer 42 is preferably in the form of a polymeric film having one or more of the following properties: maximum thermal shrinkage which is less than about 2.2 percent (machine-direction) or 1.6 percent (cross machine direction), more preferably less than about 2.0 percent (machine-direction) or less than about 1.4 percent (cross machine-direction); and a minimum tensile modulus of at least about 0.14×10$^5$ lbs/in$^2$ (984.3 kg/cm$^2$), more preferably at least about 0.30×10$^5$ lbs/in$^2$ (2109.2 kg/cm$^2$), even), more preferably at least about 1.60×10$^5$ lbs/in$^2$, and most preferably no more than about 2.2×10$^5$ lbs/in$^2$. The specific gravity of the film is preferably about 0.90 to about 0.91. The thickness of the second layer can vary between about 0.003 inches (0.076 mm) to about 0.020 inches (0.51 mm), preferably about 0.005 inches (0.127 mm). The film is substantially cell free.

The composite multi-laminar sheet is characterized by a modulus of at least about 1200 lbs/in$^2$ (84.4 kg/cm$^2$), more preferably at least about 1500 lbs/in$^2$ (105.5 kg/cm$^2$), most preferably at least about 1800 lbs/in$^2$ (126.6 kg/cm$^2$). In one embodiment of device 36, preferably the device 36 has a tensile modulus of at least about 1233 psi. It is further preferred that the tensile modulus is not greater than about 2870 psi. An example of a preferred tensile modulus for device 36 is about 2751 psi.

Two suitable polymeric films include low-density polyethylene films, high-density polyethylene film, and polypropylene. The low-density polyethylene film is characterized by the following properties: maximum thermal shrinkage which is less than about 2.2 percent (machine-direction) or less than about 1.6 percent (cross machine-direction); and a minimum tensile modulus of at least about 0.38×10$^5$ lbs/in$^2$ (2672 kg/cm$^2$). The high density polyethylene film is characterized by the following properties: maximum thermal shrinkage which is less than about 2.2 percent (machine-direction) or less than about 1.6 percent (cross machine-direction); and a minimum tensile modulus of at least about 0.6×10$^5$ lbs/in$^2$ (4218 kg/cm$^2$). The multi-laminate sheet prepared from these materials is characterized by a tensile modulus of about 1200 lbs/in$^2$ (84.4 kg/cm$^2$).

In selecting the foam material used to form the first layer and the film material used to form the second layer, it is desirable that the film material have a tensile modulus which is greater than the tensile modulus of the foam material.

According to one approach, the multi-laminar sheet, which is used to form the a multi-laminar cushioning device 36, is created by an extrusion and lamination process. Basically, a foam material of the type described above is extruded in the form of a sheet, which then is treated with an adhesive to adhere the film layer, thereby connecting the first and second layers 40,42. A pressure sensitive adhesive is an example of a class of suitable adhesive to bond together first and second layers 40, 42. It is preferred that the adhesive is compatible with both the first and second layers 40, 42.

Once the multi-laminar sheet has been prepared, the sheet can be cut to the appropriate size and configuration. For most purposes, this is intended to encompass a size and configuration of the multi-laminar sheet such that the resulting tubular, multi-laminar cushioning device 36 has an inner circumference which is substantially the same as than the outer circumference of the barrel 12. Alternatively, the multi-laminar sheet can be sized and configured such that the resulting tubular, multi-laminar cushioning device 36 has an inner circumference which is smaller than the outer circumference of the barrel 12, as described above with respect to earlier embodiments. After obtaining the appropriately sized and configured multi-laminar sheet, the sheet can be wrapped about a mandrel as illustrated in FIGS. 3A–B and the abutting ends of the sheet joined together, such as by heat fusion.

Once the multi-laminar cushioning device has been prepared, it can be installed about the barrel of the spool in a manner similar to that shown in FIGS. 3C–D to form a fiber optic spool of the present invention.

Prior to installing the multi-laminar cushioning device, it may be desirable to apply an adhesive either to the barrel or to the inner foam layer of the multi-laminar cushioning device. This will allow the multi-laminar cushioning device to adhere to the barrel surface during rotation of the spool.

Figure 7:
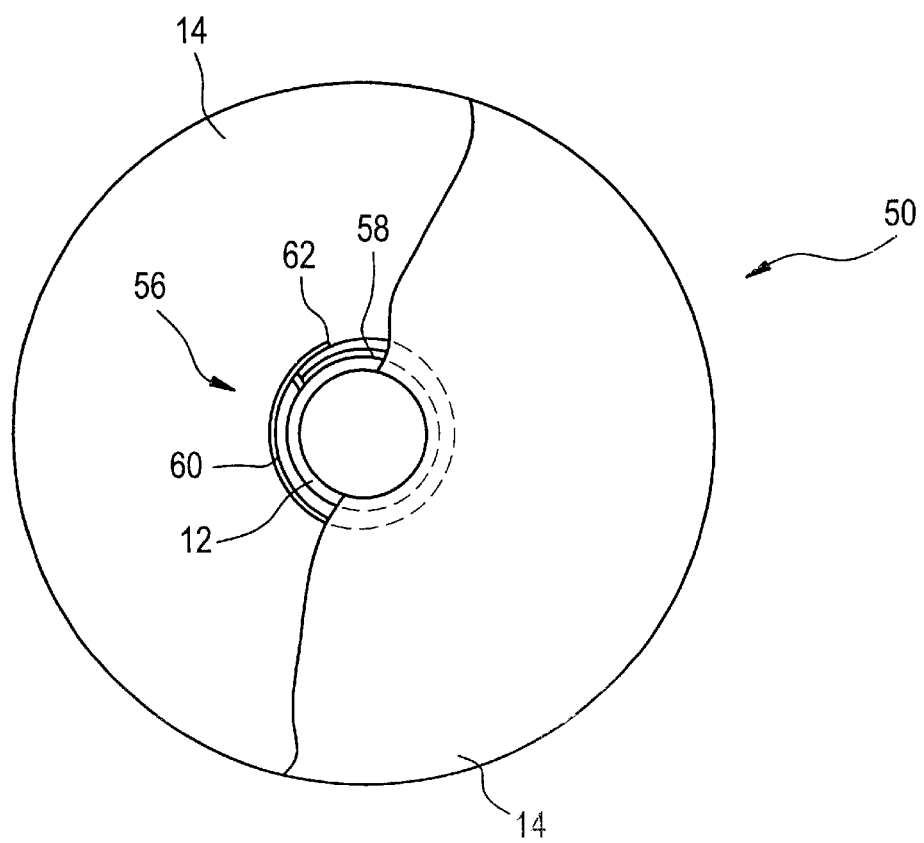
FIG. 7 is an end view of a fiber optic spool according to a third embodiment of the present invention. A portion of the flange at one end of the spool is broken away to reveal a substantially tubular, multi-laminar cushioning device of the present invention which substantially surrounds the spool barrel. As shown, the multi-laminar cushioning device is of the type prepared from the multi-laminar sheet illustrated in FIG. 6.

Another embodiment of such a fiber optic spool is illustrated in FIG. 7, where the fiber optic spool 50 is shown to include a spool containing a barrel 12 and flanges 14 positioned on opposite ends of the barrel, as well as a tubular, multi-laminar cushioning device 56 which substantially surrounds the barrel. The tubular, multi-laminar cushioning device 56 is formed of a single multi-laminar sheet that includes two layers. The first layer 58 can be formed of either an open cell foam or a closed cell foam of the types described above. The second layer 60 can be formed of a material of the type described above, which is suitable to protect the underlying foam layer.

Figure 6:
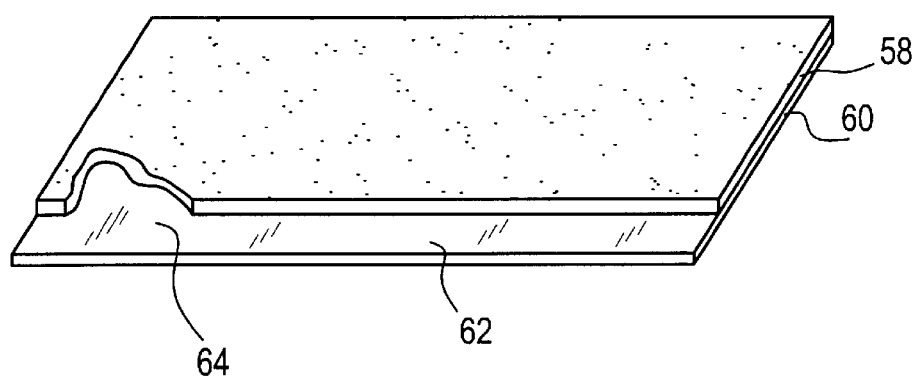
FIG. 6 is a perspective view of a multi-laminar sheet which can be used to form a multi-laminar cushioning device according to one embodiment of the present invention.

Referring to both FIGS. 6 and 7, the multi-laminar sheet (which is used to form the a multi-laminar cushioning device 56) is created by joining together the first layer with the second layer (e.g., with an adhesive). The second layer 60 includes a portion which substantially covers the first layer and a tab element 62 which extends beyond one end of the first layer. The first and second layers 58,60 can be joined together by a third layer which includes an adhesive material 64 positioned between the first and second layers and substantially co-extensive with the portion of the second layer which substantially covers the first layer. The adhesive material can also extend to cover one side of the tab element 62.

Preferably tab 62 has at least the same width as foam 58 or a width that is greater than the width of foam 58. More preferably, tab 62 is stiffer and stronger than foam 58. In a particular embodiment of the invention, tab 62 can be as thick as no more than about 10 mils, preferably no more than about 5 mils. Also tab 62 should be of sufficient length such that tab 62 develops the strength of the foam. Preferably, tab 62 extends over the foam joint. In one particular embodiment, tab 62 has a length of at least about 0.5 inches. If tab element 62 is not integral to device 56, it may be preferred that tab 62 is longer than if tab 62 were integral to device 56.

Any suitable adhesive can be used to join together the first and second layers 58,60, although pressure sensitive adhesives are preferred. A number of pressure sensitive adhesives are know in the art, including, without limitation, Master Bond (Hackensack, N.J.) LTX164.

As with previously described multi-laminar cushioning devices, the multi-laminar cushioning device 56 is sized and configured for placement about a barrel of a fiber optic spool. When the multi-laminate sheet is folded about the barrel 12 to form a substantially tubular, multi-laminate cushioning device of the present invention, the multi-laminate sheet is wrapped about the barrel with the first layer 58 contacting the barrel surface such that its opposite ends abut against one another. The tab element 62 is provided to span any gap between the abutting ends, whereby the tab element is secured to the portion of the second layer 60 which substantially covers the first layer 58. Any adhesive material, but preferably a pressure sensitive adhesive material, can be used to secure the tab element 62 to the above-mentioned portion of the second layer 60.

The gap, for purposes of the present invention, is defined as the difference between the circumference through the center (in the dimension of sheet depth) of the multi-laminar cushioning device (e.g., $C=\pi \times$(barrel diameter+½ thickness of the multi-laminar sheet)) less the length of the multi-laminar sheet (i.e., from between the opposite ends of the first layer thereof). The gap should be not more than about 0.18 inches (4.57 mm), but typically is about 0.11 inches (2.79 mm). For example, using a multi-laminar sheet which is 0.1875 inches in thickness, the circumference through the center of the multi-laminar cushioning device is $\pi \times$(6 inch barrel diameter+½(0.1875 inch thickness of sheet)) or 6.09375 $\pi$, which is about 19.1518 inches. A length of 19.05 inches for the multi-laminar sheet, therefore, will achieve a gap of about 0.1018 inches (2.59 mm).

Because the multi-laminar cushioning device 56 is assembled onto the fiber optic spool, rather than being pre-assembled prior to its installation on the barrel portions 12', it may be desirable to apply an adhesive either to the barrel 12 or to the inner foam layer of the multi-laminar cushioning device 56 prior to its installation.

From the foregoing, it should be apparent that another aspect of the present invention relates to a method of making a substantially tube-shaped, multi-laminar cushioning device of the present invention. This method includes preparing a multi-laminar sheet having opposed ends, the multi-laminar sheet including a first layer comprising an open cell foam or closed cell foam and a second layer comprising a protective material which is connected to and substantially covers the first layer, and then connecting together the opposed ends of the multi-laminar sheet to form a substantially tube-shaped, multi-laminar cushioning device having the second layer positioned external to the first layer.

Connecting the opposed ends can be performed according to the particular embodiment of the multi-laminar cushioning device which is being prepared. For example, with the multi-laminar cushioning device 36, the opposed ends are joined by heat sealing or other equivalent means. Alternatively, with the multi-laminar cushioning device 56, the opposed ends are joined together by joining the tab element 62 to the other portion of the second layer 60 as described above.

The spools of the present invention can be utilized in connection with winding devices that are employed with a draw tower, whereby optical fiber being prepared on the draw tower is taken up onto the spool at a desired rate. Thus, a further aspect of the present invention relates to a method of winding optical fiber onto a spool which is performed by winding optical fiber onto a spool of the present invention. As noted above, the spools of the present invention include a barrel and flanges positioned on opposite ends of the barrel, and a cushioning device which substantially surrounds the barrel and resists lifting away from the barrel during rotation of the spool at a velocity sufficient to wind 25 m or more of optical fiber per second. Preferably the winding is carried out at a rate of at least about 25 m/s, more preferably at least about 30 m/s or 35 m/s, even more preferably at least about 40 m/s, and most preferably at least about 50 m/s. Higher winding speeds can be achieved with the spools of the present invention than previously realized using prior art spool assemblies, thereby increasing the efficiency of draw tower operations or otherwise enabling more efficient draw tower operations to be tested and developed (i.e., because the winding rate is no longer a limitation on the production process).

Although the invention has been described in detail for the purposes of illustration, it is understood that such detail is solely for that purpose, and variations can be made therein by those skilled in the art without departing from the spirit and scope of the invention which is defined by the following claims.

What is claimed:

1. A fiber optic spool comprising:
   a spool comprising a barrel having opposed ends, a first flange secured on one end of the barrel, and a second flange secured on the other end of the barrel; and
   an elastic foam tube substantially surrounding the barrel under conditions whereby the foam tube is stressed radially while in its resting state on the barrel such that the foam tube resists lifting away from the barrel during rotation of the spool at speeds effective to wind or unwind at least about 25 m of optical fiber per second.

2. The fiber optic spool according to claim 1, wherein the foam tube comprises an closed cell foam having a density of less than about 2.2 lbs/ft$^3$ (3.52×10$^{-2}$ kg/l).

3. The fiber optic spool according to claim 1, wherein the foam tube comprises a closed cell foam having a minimum tensile modulus of about 800 lbs/in$^2$ (56.2 kg/cm$^2$).

4. The fiber optic spool according to claim 1, wherein the foam tube comprises an open cell polypropylene.

5. The fiber optic spool according to claim 1, wherein the foam tube is stressed radially while in its resting state on the barrel such that the foam tube resists lifting away from the barrel during rotation of the spool at speeds effective to wind or unwind at least about 30 m of optical fiber per second.

6. The fiber optic spool according to claim 1, wherein the elastic foam tube comprises a heat-fused seam extending from one end thereof to an opposite end thereof.

7. The fiber optic spool according to claim 1, wherein the elastic foam tube comprises abutting ends that abut along a seam and an adhesive tape adhered to the foam tube to cover the seam.

8. A method of making a fiber optic spool comprising:
   assembling a spool comprising a barrel and flanges positioned on opposite ends of the barrel; and
   installing about the barrel a foam tube which is elastic and, prior to installing, has an inner circumference that is smaller than the outer circumference of the barrel.

9. The method according to claim 8 further comprising:
   wrapping, about a mandrel, a foam sheet whose length, when not under a tensile stress, is smaller than the outer circumference of the barrel and
   sealing together the ends of the foam sheet to form the foam tube.

10. The method according to claim 8 further comprising:
    applying an adhesive to the barrel prior to said installing the foam tube.

11. The method according to claim 8 further comprising:
    applying an adhesive to the inner circumference of the foam tube prior to said installing the foam tube.

12. A method of winding optical fiber onto a spool comprising:
    providing an optical fiber spool comprising a barrel and flanges positioned on opposite ends of the barrel, and a cushioning device which substantially surrounds the barrel and resists lifting away from the barrel during rotation of the spool at a velocity sufficient to wind 25 m or more of optical fiber per second; and
    winding optical fiber onto the optical fiber spool.

13. The method according to claim 12, wherein said winding comprises winding the optical fiber at a rate of at least 25 m/s.

14. The method according to claim 13, wherein said winding comprises winding the optical fiber at a rate of at least 30 m/s.

* * * * *